Patented Mar. 9, 1948

2,437,336

UNITED STATES PATENT OFFICE 2,437,336

ALTERNATING ELECTRIC CURRENT RECTIFIER

Leslie Ernest Thompson and Alexander Jenkins, London, England, assignors, by mesne assignments, to The Union Switch and Signal Company, Swissvale, Pa., a corporation of Pennsylvania No Drawing. Application August 12, 1944, Serial No. 549,303. In Great Britain March 2, 1944

4 Claims. (Cl. 175—366)

This invention relates to alternating electric current rectifiers of the dry surface contact type comprising a semi-conductor to the surface of which a counter or contact electrode composed of a metal or alloy is applied in any suitable manner and has for its object to provide a rectifier comprising an improved electrode of this character.

The invention is particularly applicable to rectifiers of the selenium type and according to the principal feature of the invention the electrode is composed wholly or partly of one or more alkaline metals applied by spraying, sputtering or otherwise to the surface of the semi-conductor.

According to a further feature of the invention a layer of metal or alloy not containing any appreciable amount of an alkaline metal, such for example as a layer of tin, cadmium, bismuth, lead, antimony or alloys thereof, is first applied to the surface of the semi-conductor a second layer composed of one or more of the same metals as the first layer but containing in addition an alkaline metal or alloy being applied to the surface of the first layer, this metal or alloy being caused to migrate through the first layer during a subsequent forming or other operation to the boundary at the surface of the semi-conductor.

In carrying the invention into practice as applied to a selenium rectifier the counter electrode may, for example, be composed mainly of a tin-cadmium alloy and containing in addition approximately 0.5% of potassium or sodium.

An electrode of this composition is found to give satisfactory results comparable to those obtained with the counter electrode composed of a tin-cadmium alloy containing a small amount of thallium described in our Patent No. 2,279,746.

The alkaline metal may also be contained in a second layer applied to a first layer not containing this metal and applied in any suitable manner to the surface of the semi-conductor, the alkaline metal being caused to migrate to the first or inner layer during a subsequent forming or other operation.

It is of advantage particularly in cases in which the counter electrode consists wholly or contains a relatively large quantity of an alkaline metal or alloy, to coat the electrode layer with an outer layer of a relatively non-oxidisable metal or alloy in order to protect the electrode layer.

Since certain of the alkaline metals do not appear to possess any appreciable forming properties their utilisation for the purpose of the invention is considerably less advantageous than is the case when potassium or sodium is employed and while the invention is not limited to the use of those two alkaline metals, certain other metals of this character are so relatively unsuitable for the purpose of the invention that they may be disregarded in carrying the invention into practice.

Having now particularly described and ascertained the nature of our said invention and in what manner the same is to be performed, we declare that what we claim is:

1. An alternating electric current rectifier of the kind described comprising a counter or contact electrode applied to the surface of the semi-conductor in which the electrode is composed wholly or partly of potassium or sodium applied by spraying, sputtering or otherwise, for the purpose specified.

2. An alternating electric current rectifier of the kind described comprising a counter electrode composed of a first layer of tin, cadmium, bismuth, lead, antimony, or alloys thereof which as applied to the surface of the semi-conductor does not contain any appreciable amount of an alkaline metal, and a second layer applied to the first layer and containing an alkaline metal or alloy.

3. An alternating electric current rectifier of the kind described comprising a counter electrode composed of a first layer of tin, cadmium, bismuth, lead, antimony, or alloys thereof which as applied to the surface of the semi-conductor does not contain any appreciable amount of an alkaline metal, and a second layer applied to the first layer and composed of tin, cadmium, bismuth, lead, antimony, or alloys thereof to which a relatively small amount of an alkaline metal has been added.

4. An alternating electric current rectifier of the kind described comprising a counter electrode composed mainly of a tin cadmium alloy containing in addition approximately 0.5% of potassium or sodium.

LESLIE ERNEST THOMPSON.
ALEXANDER JENKINS.

REFERENCES CITED

The following references are of record in the file of this patent:

UNITED STATES PATENTS

| Number | Name | Date |
|---|---|---|
| 2,041,569 | Reerink | May 19, 1936 |
| 2,279,746 | Thompson | Apr. 14, 1942 |

FOREIGN PATENTS

| Number | Country | Date |
|---|---|---|
| 512,817 | Germany | Nov. 17, 1930 |